United States Patent [19]

Schaaf

[11] Patent Number: 4,802,838

[45] Date of Patent: Feb. 7, 1989

[54] APPARATUS FOR EXTRUSION OF FOODSTUFFS

[76] Inventor: Heinz Schaaf, Quellenweb 14 + 19a, 6277 Bad Camberg-Oberselters, Fed. Rep. of Germany

[21] Appl. No.: 926,894

[22] Filed: Nov. 4, 1986

[30] Foreign Application Priority Data

Apr. 30, 1985 [DE] Fed. Rep. of Germany ....... 3515616

[51] Int. Cl.⁴ ............................................ A21C 11/12

[52] U.S. Cl. .................................... 425/311; 264/142; 425/313; 426/503; 426/518

[58] Field of Search ............... 425/310, 311, 313, 306, 425/299; 83/591, 597, 862; 426/518, 503; 264/142

[56] References Cited

U.S. PATENT DOCUMENTS

| | | | |
|---|---|---|---|
| 2,853,027 | 9/1958 | Graves | 425/311 |
| 3,214,796 | 11/1965 | Ginauer | 425/313 |
| 3,387,069 | 6/1968 | Stohr | 425/313 |
| 3,784,533 | 1/1974 | Mach | 425/308 |
| 4,240,779 | 12/1980 | Turk | 425/313 |

FOREIGN PATENT DOCUMENTS

| | | | |
|---|---|---|---|
| 609657 | 10/1956 | Fed. Rep. of Germany | 83/592 |

*Primary Examiner*—Jay H. Woo
*Assistant Examiner*—C. S. Bushey
*Attorney, Agent, or Firm*—Anthony J. Casella; Gerald E. Hespos

[57] ABSTRACT

On an extruder for extruding foodstuffs a cutting means consisting of rotatable blades (36, 38, 40, 41) is provided. With the aid of these blades an extruded strand emerging from the nozzle (12) can be cut off or structured at the surface. The cutting blades are driven synchronously.

8 Claims, 2 Drawing Sheets

APPARATUS FOR EXTRUSION OF FOODSTUFFS

The invention relates to an apparatus for extrusion of foodstuffs comprising an extruder screw for feeding the material to be extruded, a nozzle head and a cutting means for treating the extruded material.

Extruded foodstuffs emerging as string or strand with any desired contour from the nozzle head of the extruder are common. After emergence from the nozzle the extrudate is cut off to the desired length by means of a cutting means, then packaged and for example marketed as snack.

The invention is based on the problem of providing an extrusion apparatus having a universally applicable cutting means with which a shaping of the extrudate is also possible.

This problem is solved according to the invention in that on the nozzle head a cutting blade is rotatably mounted and that the cutting blade is led past the nozzle opening. Depending on the rotating speed of the cutting blade the extrudate can be cut off in shorter or longer sections.

According to a preferred embodiment the cutting blade is mounted on a shaft and the shaft is mounted via bearings in at least one bearing plate secured to the nozzle head. For the rotary drive of the shaft according to a preferred embodiment a toothed wheel is mounted fixed in rotation on the shaft and the rotary drive is via a toothed belt engaging the toothed wheel.

In a further development two or more cutting blades may be arranged distributed over the periphery on the nozzle head. One cutting blade can move over the entire nozzle opening and the other cutting blade or blades can move over the opening only at the periphery so that by means of these cutting blades only an incision is made on the extrudate. This makes it possible to obtain a specific surface structuring of the extrudate due to the expansion of the extrudate after emergence from the nozzle head (due to the pressure drop the liquid contained in the extrudate escapes as vapor with simultaneous swelling of the extrudate). For example, with an extrudate having the outlines of an animal an incision can be made at the area representing the legs so that after expansion four legs are visible at the bottom of the animal. On appropriate setting of the incision and severing blades and appropriate selection of the incision area plastically shaped extrudate portions can be obtained in the final state.

According to a preferred embodiment four cutting blades are provided which are arranged in cross manner, the toothed wheels disposed on the shafts of the cutting blades are connected together via toothed belts and on the shaft of a cutting blade a second toothed wheel is provided which is connected via a toothed belt to a drive motor. This arrangement ensures a synchronous movement of the cutting blades so that the extrudate emerging from the nozzle is always provided with an incision or cut off at a predetermined time.

According to a further preferred embodiment at the nozzle head a rotatable ring is disposed and on the rotatable ring a cutting blade directed radially to the nozzle opening is secured. A plurality of cutting blades may also be distributed on the rotatable ring over the periphery. It is possible with this arrangement for example to provide a rod-shaped extrudate with an incision resulting in a helical configuration having one or more threads.

Between the rotatable ring and the nozzle head a bearing is preferably disposed and the rotatable ring is provided at the outer side with a peripheral groove for receiving a drive belt.

For forming for example two opposite helical lines on the outer side of a rod-shaped extrudate preferably two oppositely running rotatable rings with cutting blades can be provided.

In a further development of the invention the cutting blades can be radially and/or axially adjustable with respect to the nozzle head so that in particular the incision depth of the non-severing blades can be controlled.

Examples of embodiment of the invention will be explained in detail with the aid of the following drawings, wherein.

Figure 1:
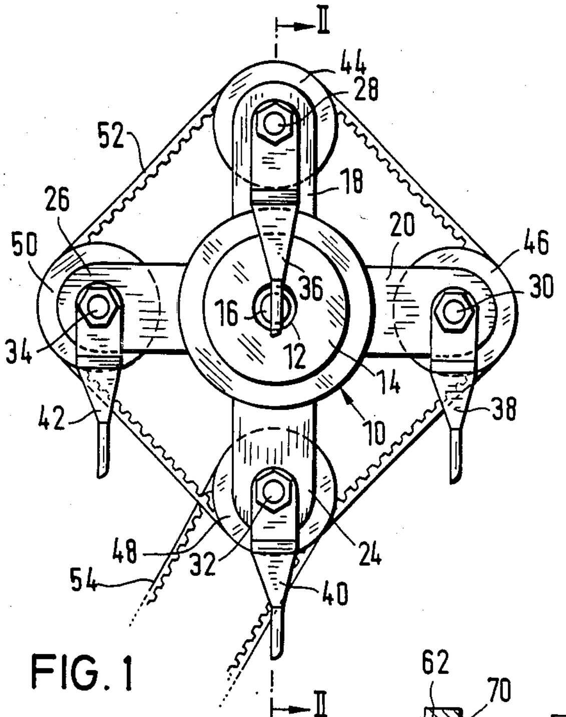
FIG. 1 shows a front view of a first embodiment of a cutting means.

FIG. 1 shows a front view of a nozzle head 10 of a foodstuff extruder. The nozzle head 10 comprises an annular nozzle 12 which is defined by the inner bore of the plate 14 and the outer surface of a mandrel 16. Distributed over the periphery of the outer side of the nozzle head 10 are bearing means 18, 20, 24 and 26 for cutting blades 36, 38, 40 and 42 mounted on said bearing means on rotating shafts 28, 30, 32 and 34. Rotatably mounted on the shaft 28 is a toothed wheel 44, on the shaft 30 a toothed wheel 46, on the shaft 32 a toothed wheel 48 and on the shaft 34 a toothed wheel 50. A toothed belt 52 is led over the toothed wheels 44, 46, 48 and 50 so that the toothed wheels and thus the shafts and the cutting blades mounted thereon rotate synchronously. The drive of the cutting blades is via a toothed belt 54 which is arranged between a toothed wheel 56 disposed fixed in rotation on the shaft 32 and a drive unit which is not illustrated.

Figure 2:
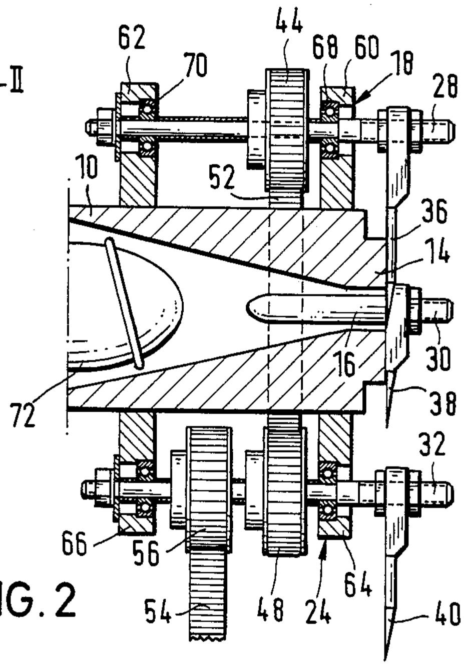
FIG. 2 is a section along the line II—II of FIG. 1.

It is apparent from FIG. 2 that each bearing arrangement 18, 20, 24 and 26 consists of two bearing plates 60, 62, 64, 66 secured to the outer side of the nozzle head 10. The shaft 28 is mounted in the bearing plate 20 via an antifriction bearing 68 and in the bearing plate 62 via an antifriction bearing 70. A corresponding mounting of the shafts is provided in the other bearing arrangements. In FIG. 2 the front end of an extruder screw 72 is indicated with the aid of which the material to be extruded is expelled from the nozzle head.

As can be seen in FIG. 1 the cutting blade 36 is led over the entire nozzle opening 12 so that when said cutting blade passes across the opening the extruded strand is cut off. The cutting blades 38, 40 and 42 are shorter so that on pivoting of the blade 38 through 90° the blade 40 through 180° and the blade 42 through 270° in the clockwise direction the extrudate emerging from the nozzle opening is only cut into on the outside. Due to the expansion occurring on exit of the extrudate a desired surface configuration thereof can then be obtained.

Figure 3:
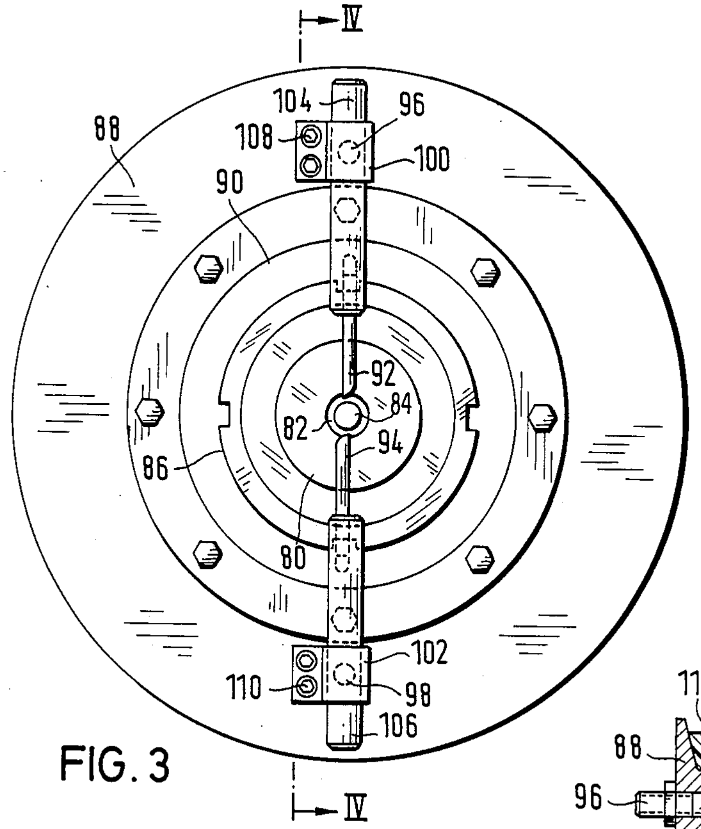
FIG. 3 shows a front view of a second embodiment of a cutting means.
Figure 4:
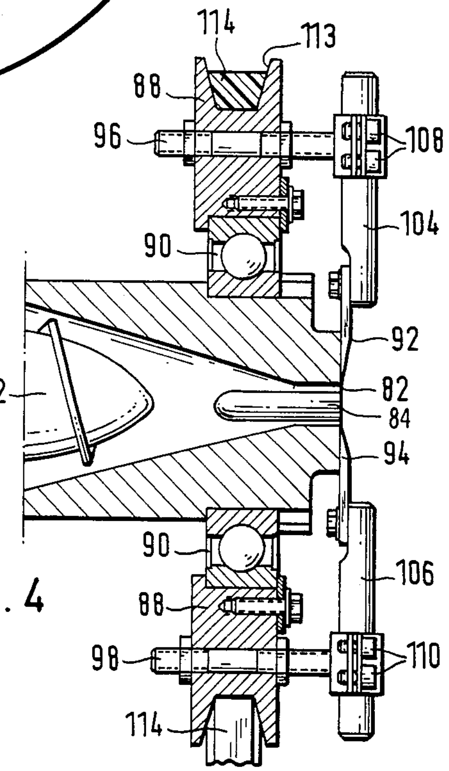
FIG. 4 is a section along the line IV—IV of FIG. 3.

FIG. 3 shows a plan view of a nozzle head 80 with an annular nozzle 82 in the center of which a mandrel 84 is disposed. At the outside 86 of the nozzle head 80 a rotatable ring 88 is mounted via an antifriction bearing 90. At the front side of the rotatable ring 88 two cutting blades 92, 94 are disposed. For this purpose on the rotatable ring 88 journals 96, 98 are secured on which plates 100, 102 are provided in which the shank 104 and 106 of the blade 92 and 94 respectively is clamped. After release of screws 108 and 110 the blades 92 and 94 respectively can be radially displaced in their distance from the nozzle opening 82. As apparent from FIG. 2 the journals 96 and 98 can be adjusted axially on the rotatable ring 88 so that the distance of the blades 92 and 94 from the nozzle opening 82 is adjustable. In FIG. 4 the front end of an extruder screw 112 is indicated. On the rotatable ring 88 two blades are disposed but it would be possible to provide several blades. Likewise, it would be possible to provide a second rotatable ring at the outer side of the nozzle head and drive said rotatable ring in opposite direction to the rotatable ring 88 so that by the incision of the outer side of the extruded strand oppositely extending thread configuration could be formed.

The rotatable ring 88 is formed at its outer periphery with a diverging U-shaped peripheral groove 113 in which a drive belt 114 engages. Said drive belt 114 is led to a drive unit which is not illustrated and via which the rotatable ring 88 is set in rotation.

We claim:

1. Apparatus for extrusion of foodstuffs comprising an extruder screw for feeding the material to be extruded, a nozzle head having a nozzle opening and a cutting means for treating the extruded material, characterized in that on the nozzle head (10, 80) a plurality of cutting blades (36, 38, 40, 42; 92, 94) are rotatably mounted and that the cutting blades are led past the nozzle opening (12, 82) with one said cutting blade being movable over the entire nozzle opening and with each remaining cutting blade being movable over the nozzle opening only at the periphery.

2. Apparatus according to claim 1, characterized in that on the nozzle head (80) a rotatable ring (88) is disposed and that on the rotatable ring (88) said cutting blades (92, 94) are secured.

3. Apparatus according to claim 2, characterized in that between the rotatable ring (88) and the outer side (86) of the nozzle head (80) a bearing (90) is disposed.

4. Apparatus according to claim 2, characterized in that the rotatable ring (88) is formed at the outer side with a peripheral groove (113) for receiving a drive belt (114).

5. Apparatus according to claim 2 characterized in that said plurality of cutting blades (92, 94) are distributed over the inner periphery on the rotatable ring (88).

6. Apparatus according to claim 2, characterized in that two oppositely running rotatable rings with cutting blades are provided.

7. Apparatus according to claim 1, characterized in that the cutting blades (36, 38, 40, 42,; 92, 94) are radially and/or axially adjustable with respect to the nozzle head (10, 80).

8. Apparatus for extrusion of foodstuffs comprising an extruder screw for feeding material to be extruded, a nozzle head having a nozzle opening and cutting means for treating the extruded material, said apparatus being characterized by four shafts disposed about said nozzle head and rotatably mounted relative thereto via bearings in at least one bearing plate, a first toothed wheel fixedly mounted to each said shaft, a first toothed belt in engagement with the respective first toothed wheels such that movement of the first toothed belt effects rotation of each said first toothed wheel and the corresponding shafts, a second toothed wheel securely mounted to one said shaft, a second toothed belt in engagement with said second toothed wheel, a drive unit in engagement with said second toothed belt for effecting movement of said second toothed belt and corresponding rotation of each said shaft, and a cutting blade mounted to each said shaft for rotation therewith, said cutting blades being dimensioned to be led past the nozzle opening upon rotation of the respective shafts.

* * * * *